US012398056B2

(12) United States Patent
Zhang et al.

(10) Patent No.: US 12,398,056 B2
(45) Date of Patent: Aug. 26, 2025

(54) SEWAGE TREATMENT SYSTEM AND METHOD OF CONTINUOUS FLOW STEP-FEED SHORT-CUT DENITRIFICATION-ANAEROBIC AMMONIA OXIDATION COUPLED WITH DENITRIFICATION

(71) Applicants: BEIJING DRAINAGE GROUP CO., LTD, Beijing (CN); BEIJING DRAINAGE TECHNOLOGY CO., LTD, Beijing (CN)

(72) Inventors: Shujun Zhang, Beijing (CN); Jianming Huang, Beijing (CN); Xiaoyu Han, Beijing (CN); Xiaocong Wang, Beijing (CN); Jiatong Jiao, Beijing (CN)

(73) Assignees: BEIJING DRAINAGE GROUP CO., LTD, Beijing (CN); BEIJING DRAINAGE TECHNOLOGY CO., LTD, Beijing (CN)

(*) Notice: Subject to any disclaimer, the term of this patent is extended or adjusted under 35 U.S.C. 154(b) by 407 days.

(21) Appl. No.: 18/004,110

(22) PCT Filed: Nov. 25, 2021

(86) PCT No.: PCT/CN2021/133133
§ 371 (c)(1),
(2) Date: Jan. 3, 2023

(87) PCT Pub. No.: WO2022/199097
PCT Pub. Date: Sep. 29, 2022

(65) Prior Publication Data
US 2023/0264994 A1    Aug. 24, 2023

(30) Foreign Application Priority Data
Mar. 26, 2021  (CN) .................. 202110330914.4

(51) Int. Cl.
*C02F 3/30* (2023.01)
*C02F 3/28* (2023.01)
(Continued)

(52) U.S. Cl.
CPC ............ *C02F 3/307* (2013.01); *C02F 3/2806* (2013.01); *C02F 3/305* (2013.01); *C02F 9/00* (2013.01);
(Continued)

(58) Field of Classification Search
CPC ........ C02F 3/006; C02F 3/307; C02F 3/2806; C02F 9/00; C02F 3/305; C02F 2101/163;
(Continued)

(56) References Cited

U.S. PATENT DOCUMENTS

2016/0272519 A1    9/2016    Ledwell et al.

FOREIGN PATENT DOCUMENTS

| CN | 109502906 A | 3/2019 |
| CN | 110330172 A | 10/2019 |

(Continued)

OTHER PUBLICATIONS

Chen et al CN 109502906 A, English machine translation, pp. 1-4 (Year: 2019).*
(Continued)

*Primary Examiner* — Claire A Norris
(74) *Attorney, Agent, or Firm* — FisherBroyles, LLP; Roger L. Browdy; Ronni S. Jillions

(57) ABSTRACT

The present invention belongs to the technical field of sewage denitrification. Disclosed are a sewage treatment system and method of continuous flow step-feed short-cut denitrification-anaerobic ammonia oxidation coupled with denitrification. The system comprises a primary sedimentation tank, a bioreactor and a secondary sedimentation tank, which are connected in sequence, wherein the bioreactor
(Continued)

comprises a pre-starvation zone, a first hypoxic zone, a first aerobic zone, a second hypoxic zone and a second aerobic zone; an agitator is arranged in each of the pre-starvation zone, the first hypoxic zone and the second hypoxic zone; an aeration device is arranged in both the first aerobic zone and the second aerobic zone; a polyurethane sponge filler is arranged in both the first hypoxic zone and the second hypoxic zone; and a nitrification liquid reflux pump is arranged between the first aerobic zone and the pre-starvation zone. By rationally utilizing a carbon source of raw sewage, the present invention develops a sewage denitrification system and a process control method which have the advantages of an efficient denitrification effect, a simple procedure flow, being convenient in terms of operation and maintenance, and being automated and intelligent.

10 Claims, 1 Drawing Sheet

(51) Int. Cl.
*C02F 9/00* (2023.01)
*C02F 101/16* (2006.01)

(52) U.S. Cl.
CPC .. *C02F 2101/163* (2013.01); *C02F 2209/008* (2013.01); *C02F 2209/02* (2013.01); *C02F 2209/08* (2013.01); *C02F 2209/14* (2013.01); *C02F 2209/15* (2013.01); *C02F 2209/22* (2013.01); *C02F 2209/38* (2013.01)

(58) Field of Classification Search
CPC .......... C02F 2209/006; C02F 2209/008; C02F 2209/02; C02F 2209/08; C02F 2209/14; C02F 2209/15; C02F 2209/22; C02F 2209/38
USPC ........................................................ 210/605
See application file for complete search history.

(56) References Cited

FOREIGN PATENT DOCUMENTS

| CN | 112125396 A | | 12/2020 | |
| CN | 112142263 A | * | 12/2020 | ............... C02F 9/00 |
| CN | 212387932 U | | 1/2021 | |
| CN | 212450841 U | | 2/2021 | |
| CN | 113044984 A | | 6/2021 | |
| CN | 214829330 U | | 11/2021 | |

OTHER PUBLICATIONS

Zhang et al, CN 112142263 A, English machine translation, pp. 1-10 (Year: 2020).*

* cited by examiner

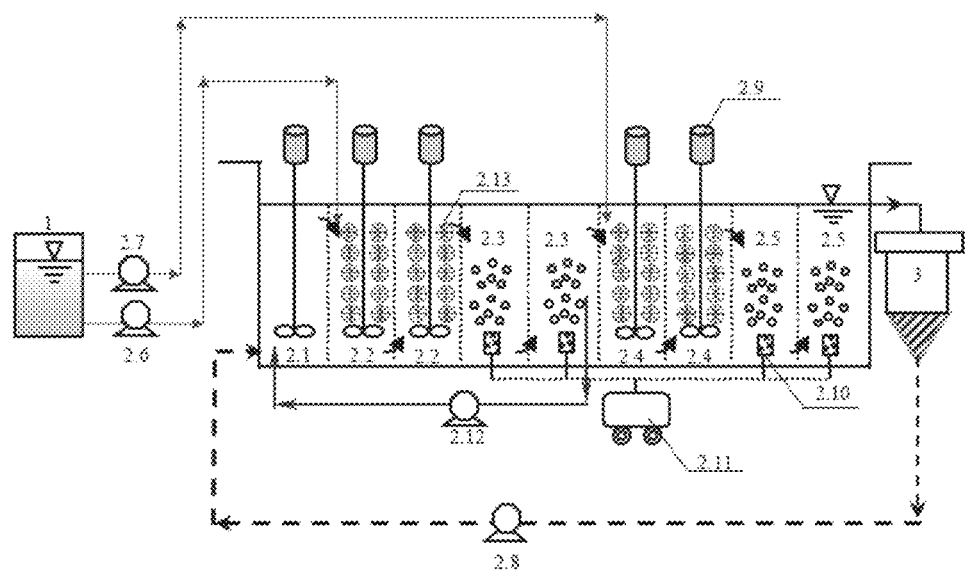

SEWAGE TREATMENT SYSTEM AND METHOD OF CONTINUOUS FLOW STEP-FEED SHORT-CUT DENITRIFICATION-ANAEROBIC AMMONIA OXIDATION COUPLED WITH DENITRIFICATION

FIELD OF TECHNOLOGY

The present invention belongs to the technical field of sewage denitrification, and more specifically, relates to a sewage treatment system and method of continuous flow step-feed short-cut denitrification-anaerobic ammonia oxidation coupled with denitrification.

BACKGROUND

With the development of sewage treatment technology, it has become a trend that sewage denitrification treatment meets the discharge standards, however, the increase in operating costs caused by the addition of external carbon sources is the key to restrict the low-consumption operation of many sewage treatment plants. At the same time, sewage treatment factories in China consume more than $1 \times 10^{11}$ KWh of electric energy each year, and the aeration energy consumption required for the ammonia nitrogen oxidation in the sewage treatment aeration tank accounts for more than 40% of the electric energy consumption of the sewage treatment factories, which seriously restricts the economic efficiency of the operation of the sewage treatment factories. Therefore, it is an urgent problem in the field of sewage treatment to find a high efficiency and low consumption nitrogen removal process and a process control method with stable operation and simple operation.

Anaerobic ammonia oxidation autotrophic nitrogen removal process refers to the way to complete nitrogen removal by converting ammonia nitrogen and nitrite nitrogen into nitrogen, and this process has the advantages of saving aeration energy consumption and saving organic carbon sources comparing with traditional nitrification/denitrification biological nitrogen removal, however, the accumulation of nitrite nitrogen is greatly affected by environmental factors (such as temperature, pH, DO, etc.) and substrate concentration, although the process has been widely used in the field of high ammonia nitrogen wastewater for temperature control treatment and homogenization of water quality and quantity to maintain stable substrate concentration, it is rarely used in the mainstream treatment of sewage with low substrate concentration such as urban domestic sewage. At the same time, the anaerobic ammonia oxidation process cannot remove the nitrate nitrogen carried by the influent and the nitrate nitrogen generated during the anaerobic ammonia oxidation process, resulting in high total nitrogen concentration in the effluent, which requires the deep denitrification treatment by adding external carbon sources, thus increasing the treatment cost.

Therefore, it is urgent to propose a new treatment device and method for sewage treatment with low substrate concentration such as urban domestic sewage at present.

SUMMARY

The purpose of the present invention is to propose a sewage treatment system and method of continuous flow step-feed short-cut denitrification-anaerobic ammonia oxidation coupled with denitrification in view of the shortcomings of the existing sewage denitrification process. The present invention rationally utilizes the carbon source of raw sewage and develops a sewage denitrification system and a process control method with high efficiency denitrification effect, simple procedure flow, convenient operation and maintenance, and automation and intelligence, the new process of short-cut denitrification-anaerobic ammonia oxidation coupled with the traditional denitrification to rationally use the organic matter in the sewage to achieve the purpose of high-efficiency denitrification of low substrate sewage.

In order to achieve the above objective, on the one hand, the present invention provides a sewage treatment system of continuous flow step-feed short-cut denitrification-anaerobic ammonia oxidation coupled with denitrification, the system includes a primary sedimentation tank, a bioreactor and a secondary sedimentation tank, which are connected in sequence;

The bioreactor includes a pre-starvation zone, a first hypoxic zone, a first aerobic zone, a second hypoxic zone, and a second aerobic zone; the pre-starvation zone, the first hypoxic zone, the first aerobic zone, the second hypoxic zone and the second aerobic zone are sequentially connected through a partition plate with through-holes at the upper part;

The pre-starvation zone, the first hypoxic zone and the second hypoxic zone are all arranged with agitators inside;

Both the first aerobic zone and the second aerobic zone are arranged with aeration devices inside, the aeration devices are connected to an air pump located outside the bioreactor, and the air pump is used to provide dissolved oxygen to the system;

Both the first hypoxic zone and the second hypoxic zone are arranged with polyurethane sponge fillers inside;

A nitrification liquid reflux pump is arranged between the first aerobic zone and the pre-starvation zone;

The primary sedimentation tank is respectively connected to the second hypoxic zone and the first hypoxic zone of the bioreactor through a first water inlet pump and a second water inlet pump;

The water inlet end of the secondary sedimentation tank is connected to the second aerobic zone; the bottom of the secondary sedimentation tank is connected to the pre-starvation zone through a sludge reflux pump;

The system also includes a PLC control subsystem, and the PLC control subsystem is used to realize the chain reaction control of the system.

On the other hand, the present invention provides a sewage treatment method of continuous flow step-feed short-cut denitrification-anaerobic ammonia oxidation coupled with denitrification, the method adopts the sewage treatment system of continuous flow step-feed short-cut denitrification-anaerobic ammonia oxidation coupled with denitrification, including the following steps:

S1: Introducing the sewage into the primary sedimentation tank and controlling the temperature of the primary sedimentation tank, inoculating short-cut denitrifying bacteria in the bioreactor, and inoculating anaerobic ammonia oxidation bacteria in the first hypoxic zone and the second hypoxic zone of the bioreactor.

S2: Turning on the first water inlet pump and the second water inlet pump in sequence; turning on the aeration device in the first aerobic zone and adjusting the aeration amount of the aeration device to the preset parameter, when the solution in the first aerobic zone flows automatically to the second hypoxic zone; turning on the aeration device in the second aerobic zone, adjusting the aeration amount of the aeration device to the preset parameter, and meanwhile turning on the nitrification liquid reflux pump, when the solution in the second hypoxic zone flows automatically to the second aerobic zone; turning on the sludge reflux pump, when the supernatant of the secondary sedimentation tank flows out along an overflow tank.

The technical scheme of the present invention has the following beneficial effects:

(1) The system structure design of the present invention is more reasonable, and it is easy to upgrade, optimize and regulate the existing sewage plants using this system structure, while improving the total nitrogen removal efficiency of urban sewage, the system structure can effectively use the organics in the original sewage, and the standard discharge can be achieved without subsequent treatment.

(2) The present invention solves the problem of competition and coexistence of anaerobic ammonia oxidation bacteria and short-cut denitrifying bacteria through the symbiosis system of activated sludge and biofilm, and improves the anaerobic ammonia oxidizing biomass and activity; the carbon source in the hypoxic zone can be reasonably set by step-feed to make the carbon source in the hypoxic zone be in a scarce substrate, the short-cut denitrification-anaerobic ammonia oxidation process in hypoxic zone is realized by taking advantage of the characteristic of denitrification process to complete the transformation of nitrate nitrogen into nitrite nitrogen in priority.

(3) In the invention, a pre-hypoxic zone is set in front of the first hypoxic zone to realize a short period of nitrate nitrogen enrichment, so that functional microorganisms are in the hunger state of COD substrate, therefore, efficient autotrophic denitrification is realized by controlling and optimizing the ratio of nitrate nitrogen/ammonia nitrogen concentration in the hypoxic zone, optimizing and adjusting the proportion of influent water, and promoting the stable operation of the short-cut denitrification-anaerobic ammonia oxidation coupled denitrification process in the hypoxic zone, (4) The present invention effectively solves the problems of insufficient carbon source of urban domestic sewage, high aeration energy consumption and high concentration of nitrate nitrogen in the effluent, and the effluent quality is stable and reaches Class I A standard of Discharge Standard of Pollutants for Municipal Wastewater Treatment Plants (GB18918-2002), The present invention has obvious energy saving and consumption reduction effect.

(5) The present invention can effectively use the carbon source in the sewage, and complete high efficiency denitrification under the condition of ensuring the high efficiency removal of COD. The short-cut denitrification-anaerobic ammonia oxidation coupled denitrification process can reduce the aeration energy consumption by about 45% and the carbon source demand by 80% comparing with traditional nitrification/denitrification process, and has a good application prospect in the treatment of urban sewage.

Other features and advantages of the present invention will be described in detail in the following specific embodiments.

BRIEF DESCRIPTION OF THE DRAWINGS

The above and other purposes, characteristics and advantages of the present invention will become more apparent by using a more detailed description of the exemplary embodiments of the present invention combined with the accompanying drawings. In an exemplary embodiment of the present invention, the same accompanying drawing mark usually represents the same part.

FIG. 1 is a schematic diagram of the sewage treatment system of continuous flow step-feed short-cut denitrification-anaerobic ammonia oxidation coupled with denitrification provided by the present invention.

Reference numbers are described as follows:
1—primary sedimentation tank; 2.1—pre-starvation zone; 2.2—first hypoxic zone; 2.3—first aerobic zone: 2.4—second hypoxic zone; 2.5—second aerobic zone; 2.6—second water inlet pump; 2.7—first water inlet pump; 2.8—sludge reflux pump: 29—agitator; 2.10—aeration device; 2.11—air pump; 2.12—nitrification liquid reflux pump; 2.13—polyurethane sponge filler; 3—secondary sedimentation tank.

DESCRIPTION OF THE EMBODIMENTS

Preferred embodiments of the present invention are described in more detail below with reference to the accompanying drawings. Although preferred embodiments of the present invention are shown in the accompanying drawings, it should be understood that the present invention may be realized in various forms and should not be limited by the embodiments described here. On the contrary, these embodiments are provided in order to make the present invention more thorough and complete, and to enable the complete communication of the scope of the present invention to the person skilled in the art.

On the one hand, the present invention provides a sewage treatment system of continuous flow step-feed short-cut denitrification-anaerobic ammonia oxidation coupled with denitrification, the system includes a primary sedimentation tank, a bioreactor and a secondary sedimentation tank, which are connected in sequence.

The bioreactor includes a pre-starvation zone, a first hypoxic zone, a first aerobic zone, a second hypoxic zone, and a second aerobic zone; the pre-starvation zone, the first hypoxic zone, the first aerobic zone, the second hypoxic zone and the second aerobic zone are sequentially connected through a partition plate with through-holes at the upper part.

The pre-starvation zone, the first hypoxic zone and the second hypoxic zone are all arranged with agitators inside.

Both the first aerobic zone and the second aerobic zone are arranged with aeration devices inside, the aeration devices are connected to an air pump located outside the bioreactor, and the air pump is used to provide dissolved oxygen to the system.

Both the first hypoxic zone and the second hypoxic zone are arranged with polyurethane sponge fillers inside.

A nitrification liquid reflux pump is arranged between the first aerobic zone and the pre-starvation zone.

The primary sedimentation tank is respectively connected to the second hypoxic zone and the first hypoxic zone of the bioreactor through a first water inlet pump and a second water inlet pump.

The water inlet end of the secondary sedimentation tank is connected to the second aerobic zone: the bottom of the secondary sedimentation tank is connected to the pre-starvation zone through a sludge reflux pump.

The system also includes a PLC control subsystem, and the PLC control subsystem is used to realize the chain reaction control of the system.

According to the present invention, preferably, the pre-starvation zone, the first hypoxic zone, the first aerobic zone, the second hypoxic zone and the second aerobic zone all include a plurality of cells, and each cell is connected to the adjacent cell through a partition plate with through-holes at the lower pail.

According to the present invention, preferably, each cell of the pre-starvation zone, the first hypoxic zone and the second hypoxic zone is arranged with agitators inside.

According to the present invention, preferably, each cell of the first aerobic zone and the second aerobic zone is arranged with aeration devices inside.

According to the present invention, preferably, each cell of the first hypoxic zone and the second hypoxic zone is arranged with polyurethane sponge fillers inside.

According to the present invention, preferably, the water outlet pipe of the bioreactor is arranged at the outlet of the last cell of the second aerobic zone. The water inlet end of the secondary sedimentation tank is connected with the second aerobic zone through the water outlet pipe of the bioreactor.

According to the present invention, preferably, the nitrification liquid reflux pump is arranged between the last cell of the first aerobic zone and the pre-starvation zone.

According to the present invention, preferably, the PLC control subsystem includes a PLC controller, a temperature controller which is arranged in the primary sedimentation tank, a gas flow sensor which is arranged at the air outlet of the air pump, DO concentration sensors which are arranged in each cell of the first aerobic zone and the second aerobic zone respectively, COD concentration sensors, ammonia nitrogen concentration sensors and nitrate nitrogen concentration sensors which are respectively arranged in each cell of the first hypoxic zone and second hypoxic zone. Each sensor is communicatively connected with the PLC controller.

In the present invention, the PLC controller is a programmable PLC controller. Each sensor sends the gas flow signal and concentration signal detected in real time to the programmable PLC controller. The programmable PLC controller is also connected with the first water inlet pump, the second water inlet pump, the sludge reflux pump and the air pump, after data processing and conversion of the received real time signals, the programmable PLC controller compares and stores them with the preset corresponding parameter thresholds, and regulates the actual operating parameters of the first water inlet pump, the second water inlet pump, the sludge reflux pump and the air pump according to the comparison results.

According to the present invention, preferably, the PLC control subsystem also includes a signal transceiver connected with the PLC controller, the signal transceiver is connected with a cloud server through wireless network communication, and the cloud server is connected with a remote central control center or a smart handheld terminal through wireless network communication.

On the other hand, the present invention provides a sewage treatment method of continuous flow step-feed short-cut denitrification-anaerobic ammonia oxidation coupled with denitrification, the method adopts the sewage treatment system of continuous flow step-feed short-cut denitrification-anaerobic ammonia oxidation coupled with denitrification, including the following steps:

S1: Introducing the sewage into the primary sedimentation tank and controlling the temperature of the primary sedimentation tank, inoculating short-cut denitrifying bacteria in the bioreactor, and inoculating anaerobic ammonia oxidation bacteria in the first hypoxic zone and the second hypoxic zone of the bioreactor.

S2: Turning on the first water inlet pump and the second water inlet pump in sequence; turning on the aeration device in the first aerobic zone and adjusting the aeration amount of the aeration device to the preset parameter, when the solution in the first aerobic zone flows automatically to the second hypoxic zone; turning on the aeration device in the second aerobic zone, adjusting the aeration amount of the aeration device to the preset parameter, and meanwhile turning on the nitrification liquid reflux pump, when the solution in the second hypoxic zone flows automatically to the second aerobic zone; turning on the sludge reflux pump, when the supernatant of the secondary sedimentation tank flows out along an overflow tank.

According to the present invention, preferably, in step S1:

The temperature of the primary sedimentation tank is controlled to be 15-35° C.;

The nitrite accumulation rate of the short-cut denitrifying bacteria is greater than 40%, and the concentration of which is 3000-4000 mg/L.

Inoculating anaerobic ammonia oxidation bacteria in each cell of the first hypoxic zone and the second hypoxic zone of the bioreactor, and arranging anaerobic ammonia oxidation bacteria on the polyurethane sponge fillers, the total nitrogen removal load of anaerobic ammonia oxidation bacteria is greater than 1.0 Kg—N/(m$^3$·d).

According to the present invention, preferably, in step S2:

The sewage is introduced into the bioreactor through the primary sedimentation tank by the first water inlet pump and the second water inlet pump, and the hydraulic retention time is controlled to be 10-12 h, including 1-1.5 h in the pre-hypoxic zone.

The inlet water flow threshold of the first water inlet pump is 1.92-2.68 L/h, and the inlet water flow threshold of the second water inlet pump is 1.15-1.92 L/h.

The DO concentration threshold of the first aerobic zone is 2-4 mg/L; the DO concentration threshold of the second aerobic zone is 3-5 mg/L.

The nitrification liquid reflux ratio is 200%-300%, and the sludge reflux ratio is 80-100%.

The threshold of the preset parameter of the aeration amount of the aeration device is 100-300 L/h.

The ammonia nitrogen concentration in the effluent of the first aerobic zone is controlled to be 1-2 mg/L, and the ammonia nitrogen concentration in the effluent of the second aerobic zone is controlled to be 3-5 mg/L if the ammonia nitrogen concentration is greater than the upper limit, increasing the aeration amount, if the ammonia nitrogen concentration is less than the lower limit, reducing the aeration amount.

The concentration ratio of nitrate nitrogen/ammonia nitrogen in the first hypoxic zone is controlled to be 1.2-1.5, if the concentration ratio of nitrate nitrogen/ammonia nitrogen is greater than the upper limit, increasing the water inlet flow of the second water inlet pump or reducing the reflux ratio of the nitrification liquid reflux; if the concentration ratio of nitrate nitrogen/ammonia nitrogen is less than the lower limit, reducing the water inlet flow of the second water inlet pump or increasing the reflux ratio of the nitrification liquid reflux.

The concentration ratio of nitrate nitrogen/ammonia nitrogen in the second hypoxic zone is controlled to be 0.8-1.2, and if the concentration ratio of nitrate nitrogen/ammonia nitrogen is greater than the upper limit, increasing the water inlet flow of the first water inlet pump; if the concentration ratio of nitrate nitrogen/ammonia nitrogen is less than the lower limit value, reducing the water inlet flow of the first water inlet pump.

The COD/nitrate nitrogen concentration ratio of the first hypoxic zone and the second hypoxic zone are controlled to be 2-4, if the COD/nitrate concentration ratio is greater than the upper limit, reducing the inlet water flow of the first water inlet pump and the second water inlet pump; if the COD/nitrate nitrogen concentration ratio is less than the lower limit, increasing the inlet water flow of the first water inlet pump and the second water inlet pump.

In the present invention, the short-cut denitrification-anaerobic ammonia oxidation coupled denitrification process includes two pails: short-cut denitrification-anaerobic ammonia oxidation and denitrification. In the short-cut denitrification-anaerobic ammonia oxidation process. COD in sewage is used as an electronic donor to reduce the nitrate nitrogen returned from the nitrification liquid reflux to nitrite nitrogen, which is provided as a substrate for anaerobic ammonia oxidation to complete autotrophic denitrification; the denitrification process uses the remaining COD to convert nitrate nitrogen or nitrite nitrogen into nitrogen. This process can effectively use the carbon source in the primary sedimentation water, and complete high efficiency denitrification under the condition of ensuring the high efficiency removal of COD. The short-cut denitrification-anaerobic ammonia oxidation coupled denitrification process can reduce the aeration energy consumption by about 45% and the carbon source demand by 80% comparing with traditional nitrification/denitrification process, and has a good application prospect in the treatment of urban sewage.

The present invention is described in detail in the following embodiments.

Embodiment 1

As shown in FIG. 1, the embodiment provides a sewage treatment system of continuous flow step-feed short-cut denitrification-anaerobic ammonia oxidation coupled with denitrification, the system includes a primary sedimentation tank 1, a bioreactor and a secondary sedimentation tank 3, which are connected in sequence.

The bioreactor includes a pre-starvation zone 2.1, a first hypoxic zone 2.2, a first aerobic zone 2.3, a second hypoxic zone 2.4, and a second aerobic zone 2.5; the pre-starvation zone 2.1, the first hypoxic zone 2.2, and the first aerobic zone 2.3, the second hypoxic zone 2.4 and the second aerobic zone 2.5 are sequentially connected through a partition plate with through-holes at the upper pail.

Each cell of the pre-starvation zone 2.1, the first hypoxic zone 2.2 and the second hypoxic zone 2.4 is arranged with agitators 2.9 inside.

Each cell of the first aerobic zone 23 and the second aerobic zone 2.5 is arranged with aeration devices 2.10 inside, the aeration devices 2.10 are connected to an air pump 2.11 located outside the bioreactor, and the air pump 2.11 is used to provide dissolved oxygen to the system.

Each cell of the first hypoxic zone 2.2 and the second hypoxic zone 2.4 is arranged with polyurethane sponge fillers 2.13 inside.

A nitrification liquid reflux pump 2.12 is arranged between the first aerobic zone 2.3 and the pre-starvation zone 2.1.

The primary sedimentation tank 1 is respectively connected to the second hypoxic zone 2.4 and the first hypoxic zone 2.2 of the bioreactor through a first water inlet pump 2.7 and a second water inlet pump 2.6.

The water outlet pipe of the bioreactor is arranged at the outlet of the second cell of the second aerobic zone 2.5. The water inlet end of the secondary sedimentation tank 3 is connected to the second aerobic zone 2.5 through the water outlet pipe of the bioreactor; the bottom of the secondary sedimentation tank 3 is connected to the pre-starvation zone 2.1 through a sludge reflux pump 2.8.

The system also includes a PLC control subsystem, and the PLC control subsystem is used to realize the chain reaction control of the system.

The PLC control subsystem includes a PLC controller, a temperature controller which is arranged in the primary sedimentation tank, a gas flow sensor which is arranged at the air outlet of the air pump, DO concentration sensors which are respectively arranged in each cell of the first aerobic zone and the second aerobic zone, COD concentration sensors, ammonia nitrogen concentration sensors and nitrate nitrogen concentration sensors which are respectively arranged in each cell of the first hypoxic zone and second hypoxic zone. Each sensor is communicatively connected with the PLC controller. The PLC controller and each sensor are not shown.

The PLC control subsystem also includes a signal transceiver connected with the PLC controller, the signal transceiver is connected with a cloud server through wireless network communication, and the cloud server is connected with a remote central control center or a smart handheld terminal through wireless network communication.

Embodiment 2

The embodiment provides a sewage treatment method of continuous flow step-feed short-cut denitrification-anaerobic ammonia oxidation coupled with denitrification, the method adopts the sewage treatment system of continuous flow step-feed short-cut denitrification-anaerobic ammonia oxidation coupled with denitrification described in Embodiment 1. The sewage is the primary sedimentation water of a municipal sewage treatment factory. The water quality of the municipal sewage is shown in Table 1 after testing.

TABLE 1

| | municipal sewage quality | | | | |
| --- | --- | --- | --- | --- | --- |
| project | COD (mg/L) | $NH_4^+$—N (mg/L) | TN (mg/L) | C/N | T/° C. |
| Range | 128-226 | 33.9-65.2 | 34.7-65.5 | 2.3-4.1 | 15-18 |
| mean value | 171 | 46.8 | 47.9 | 3.57 | 16 | including the following steps:

S1: Introducing the sewage into the primary sedimentation tank 1 and controlling the temperature of the primary sedimentation tank 1 to 25° C., inoculating short-cut denitrifying bacteria in each cell of the bioreactor, and inoculating anaerobic ammonia oxidation bacteria in the first hypoxic zone 2.2 and the second hypoxic zone 2.4 of the bioreactor, anaerobic ammonia oxidation bacteria is arranged on the polyurethane sponge fillers 2.13, the total nitrogen removal load of anaerobic ammonia oxidation bacteria is 1.01 Kg-N/($m^3$·d), the nitrite accumulation rate of the short-cut denitrifying bacteria is 40%, and the concentration of which is 3500 mg/L.

S2: Turning on the first water inlet pump 2.7 and the second water inlet pump 2.6 in sequence: turning on the aeration device 2.10 in the first aerobic zone 2.3 and adjusting the aeration amount of the aeration device 2.10 to the preset parameter when the solution in the first aerobic zone 2.3 flows automatically to the second hypoxic zone 2.4; turning on the aeration device 2.10 in the second aerobic zone 2.5, adjusting the aeration amount of the aeration device 2.10 to the preset parameter, and meanwhile turning on the nitrification liquid reflux pump 2.12, when the solution in the second hypoxic zone 2.4 flows automatically to the second aerobic zone 2.5; turning on the sludge reflux pump 2.8, when the supernatant of the secondary sedimentation tank 3 flows out along an overflow tank.

The sewage is introduced into the bioreactor through the primary sedimentation tank 1 by the first water inlet pump 2.7 and the second water inlet pump 2.6, and the hydraulic retention time is controlled to be 10 h, including 1 h in the pre-hypoxic zone 2.1.

The inlet water flow threshold of the first water inlet pump 2.7 is 2.68 L/h, and the inlet water flow threshold of the second water inlet pump 2.6 is 1.92 L/h.

The DO concentration threshold of the first aerobic zone 2.3 is 4 mg/L; the DO concentration threshold of the second aerobic zone 2.5 is 5 ma/L.

The nitrification liquid reflux ratio is 200%, and the sludge reflux ratio is 100%.

The threshold of the preset parameter of the aeration amount of the aeration device 2.10 is 300 L/h.

The ammonia nitrogen concentration in the effluent of the first aerobic zone 2.3 is controlled to be 2 mg/L, and the ammonia nitrogen concentration in the effluent of the second aerobic zone 2.5 is controlled to be 3 mg/L; if the ammonia nitrogen concentration is greater than the upper limit, increasing the aeration amount, if the ammonia nitrogen concentration is less than the lower limit, reducing the aeration amount.

The concentration ratio of nitrate nitrogen/ammonia nitrogen in the first hypoxic zone 2.2 is controlled to be 1.5, if the concentration ratio of nitrate nitrogen/ammonia nitrogen is greater than the upper limit, increasing the water inlet flow of the second water inlet pump 2.6 or reducing the reflux ratio of the nitrification liquid reflux; if the concentration ratio of nitrate nitrogen/ammonia nitrogen is less than the lower limit, reducing the water inlet flow of the second water inlet pump 2.6 or increasing the reflux ratio of the nitrification liquid reflux.

The concentration ratio of nitrate nitrogen/ammonia nitrogen in the second hypoxic zone 24 is controlled to be 1.2, and if the concentration ratio of nitrate nitrogen/ammonia nitrogen is greater than the tipper limit, increasing the water inlet flow of the first water inlet pump 2.7; if the concentration ratio of nitrate nitrogen/ammonia nitrogen is less than the lower limit value, reducing the water inlet flow of the first water inlet pump 2.7.

The COD/nitrate nitrogen concentration ratio of the first hypoxic zone 2.2 and the second hypoxic zone 2.4 are controlled to be 3, if the COD/nitrate concentration ratio is greater than the upper limit, reducing the inlet water flow of the first water inlet pump 2.7 and the second water inlet pump 2.6; if the COD/nitrate nitrogen concentration ratio is less than the lower limit, increasing the inlet water flow of the first water inlet pump 2.7 and the second water inlet pump 2.6.

According to the above method, the sewage treatment system of continuous flow step-feed short-cut denitrification-anaerobic ammonia oxidation coupled with denitrification was operated for a period of time, and the results showed that: after the sewage treatment system of continuous flow step-feed short-cut denitrification-anaerobic ammonia oxidation coupled with denitrification runs stably, the average concentrations of COD, $NH_4^+$—N and TN in the effluent were 26.4, 2.5 and 9.2 mg/L, respectively. The effluent quality meets the Class I A standard in the Discharge Standard of Pollutants for Municipal Wastewater Treatment Plants (GB18918-2002).

The embodiments of the present invention have been described above, and the above description is for an exemplary, not exhaustive and not limited to the disclosed embodiments. Without departing from the scope and spirit of the described embodiments, many modifications and changes are obvious to those of ordinary skill in the art.

The invention claimed is:

1. A sewage treatment system of continuous flow step-feed short-cut denitrification-anaerobic ammonia oxidation coupled with denitrification, characterized in that, the system includes a primary sedimentation tank, a bioreactor and a secondary sedimentation tank, which are connected in sequence;

the bioreactor includes a pre-starvation zone, a first hypoxic zone, a first aerobic zone, a second hypoxic zone, and a second aerobic zone; the pre-starvation zone, the first hypoxic zone, the first aerobic zone, the second hypoxic zone and the second aerobic zone are sequentially connected through a partition plate with through-holes at an upper part;

the pre-starvation zone, the first hypoxic zone and the second hypoxic zone are all arranged with agitators inside;

both the first aerobic zone and the second aerobic zone are arranged with aeration devices inside, the aeration devices are connected to an air pump located outside the bioreactor, and the air pump is used to provide dissolved oxygen to the system;

both the first hypoxic zone and the second hypoxic zone are arranged with polyurethane sponge fillers inside;

a nitrification liquid reflux pump is arranged between the first aerobic zone and the pre-starvation zone;

the primary sedimentation tank is respectively connected to the second hypoxic zone and the first hypoxic zone of the bioreactor through a first water inlet pump and a second water inlet pump;

a water inlet end of the secondary sedimentation tank is connected to the second aerobic zone; a bottom of the secondary sedimentation tank is connected to the pre-starvation zone through a sludge reflux pump;

the system also includes a PLC control subsystem, and the PLC control subsystem is used to realize chain reaction control of the system.

2. The sewage treatment system of continuous flow step-feed short-cut denitrification-anaerobic ammonia oxidation coupled with denitrification according to claim 1, wherein the pre-starvation zone, the first hypoxic zone, the first aerobic zone, the second hypoxic zone and the second aerobic zone all include a plurality of cells, and each cell is connected to the adjacent cell through a partition plate with through-holes at a lower part.

3. The sewage treatment system of continuous flow step-feed short-cut denitrification-anaerobic ammonia oxidation coupled with denitrification according to claim 2, wherein each cell of the pre-starvation zone, the first hypoxic zone and the second hypoxic zone is arranged with agitators inside;

each cell of the first aerobic zone and the second aerobic zone is arranged with aeration devices inside;

each cell of the first hypoxic zone and the second hypoxic zone is arranged with polyurethane sponge fillers inside.

4. The sewage treatment system of continuous flow step-feed short-cut denitrification-anaerobic ammonia oxidation coupled with denitrification according to claim 1, wherein a water outlet pipe of the bioreactor is arranged at an outlet of a last cell of the second aerobic zone; the water inlet end of the secondary sedimentation tank is connected with the second aerobic zone through the water outlet pipe of the bioreactor.

5. The sewage treatment system of continuous flow step-feed short-cut denitrification-anaerobic ammonia oxidation coupled with denitrification according to claim 1, wherein the nitrification liquid reflux pump is arranged between a last cell of the first aerobic zone and the pre-starvation zone.

6. The sewage treatment system of continuous flow step-feed short-cut denitrification-anaerobic ammonia oxidation coupled with denitrification according to claim 2, wherein the PLC control subsystem includes a PLC controller, a temperature controller which is arranged in the primary sedimentation tank, a gas flow sensor which is arranged at an air outlet of the air pump, DO concentration sensors which are arranged in each cell of the first aerobic zone and the second aerobic zone respectively, COD concentration sensors, ammonia nitrogen concentration sensors and nitrate nitrogen concentration sensors which are respectively arranged in each cell of the first hypoxic zone and second hypoxic zone; each sensor is communicatively connected with the PLC controller.

7. The sewage treatment system of continuous flow step-feed short-cut denitrification-anaerobic ammonia oxidation coupled with denitrification according to claim 6, wherein the PLC control subsystem also includes a signal transceiver connected with the PLC controller, the signal transceiver is connected with a cloud server through wireless network communication, and the cloud server is connected with a remote central control center or a smart handheld terminal through wireless network communication.

8. A sewage treatment method of continuous flow step-feed short-cut denitrification-anaerobic ammonia oxidation coupled with denitrification, characterized in that, the method adopts the sewage treatment system of continuous flow step-feed short-cut denitrification-anaerobic ammonia oxidation coupled with denitrification described in claim 1, including the following steps:
S1: introducing the sewage into the primary sedimentation tank and controlling a temperature of the primary sedimentation tank, inoculating short-cut denitrifying bacteria in the bioreactor, and inoculating anaerobic ammonia oxidation bacteria in the first hypoxic zone and the second hypoxic zone of the bioreactor;
S2: turning on the first water inlet pump and the second water inlet pump in sequence; turning on the aeration device in the first aerobic zone and adjusting the aeration amount of the aeration device to a preset parameter, when solution in the first aerobic zone flows automatically to the second hypoxic zone; turning on the aeration device in the second aerobic zone, adjusting the aeration amount of the aeration device to a preset parameter, and meanwhile turning on the nitrification liquid reflux pump, when solution in the second hypoxic zone flows automatically to the second aerobic zone; turning on the sludge reflux pump, when supernatant of the secondary sedimentation tank flows out along an overflow tank.

9. The sewage treatment method of continuous flow step-feed short-cut denitrification-anaerobic ammonia oxidation coupled with denitrification according to claim 8, wherein in step S1:
the temperature of the primary sedimentation tank is controlled to be 15-35° C.;
nitrite accumulation rate of the short-cut denitrifying bacteria is greater than 40%, and concentration of which is 3000-4000 mg/L;
inoculating anaerobic ammonia oxidation bacteria in each cell of the first hypoxic zone and the second hypoxic zone of the bioreactor, and arranging anaerobic ammonia oxidation bacteria on the polyurethane sponge fillers, a total nitrogen removal load of anaerobic ammonia oxidation bacteria is greater than 1.0 Kg-N/(m3·d).

10. The sewage treatment method of continuous flow step-feed short-cut denitrification-anaerobic ammonia oxidation coupled with denitrification according to claim 8, wherein in step S2:
the sewage is introduced into the bioreactor through the primary sedimentation tank by the first water inlet pump and the second water inlet pump, and the hydraulic retention time is controlled to be 10-12 h, including 1-1.5 h in the pre-starvation zone;
an inlet water flow threshold of the first water inlet pump is 1.92-2.68 L/h, and an inlet water flow threshold of the second water inlet pump is 1.15-1.92 L/h;
a DO concentration threshold of the first aerobic zone is 2-4 mg/L; a DO concentration threshold of the second aerobic zone is 3-5 mg/L;
a nitrification liquid reflux ratio is 200%-300%, and a sludge reflux ratio is 80%-100%;
a threshold of the preset parameter of the aeration amount of the aeration device is 100-300 L/h;
an ammonia nitrogen concentration in the effluent of the first aerobic zone is controlled to be 1-2 mg/L, and an ammonia nitrogen concentration in the effluent of the second aerobic zone is controlled to be 3-5 mg/L; if the ammonia nitrogen concentration is greater than an upper limit, increasing the aeration amount, if the ammonia nitrogen concentration is less than a lower limit, reducing the aeration amount;
a concentration ratio of nitrate nitrogen/ammonia nitrogen in the first hypoxic zone is controlled to be 1.2-1.5, if the concentration ratio of nitrate nitrogen/ammonia nitrogen is greater than an upper limit, increasing the water inlet flow of the second water inlet pump or reducing the reflux ratio of the nitrification liquid reflux; if the concentration ratio of nitrate nitrogen/ammonia nitrogen is less than a lower limit, reducing the water inlet flow of the second water inlet pump or increasing the reflux ratio of the nitrification liquid reflux;
a concentration ratio of nitrate nitrogen/ammonia nitrogen in the second hypoxic zone is controlled to be 0.8-1.2, and if the concentration ratio of nitrate nitrogen/ammonia nitrogen is greater than an upper limit, increasing the water inlet flow of the first water inlet pump; if the concentration ratio of nitrate nitrogen/ammonia nitrogen is less than a lower limit value, reducing the water inlet flow of the first water inlet pump;
a COD/nitrate nitrogen concentration ratio of the first hypoxic zone and the second hypoxic zone are controlled to be 2-4, if the COD/nitrate concentration ratio is greater than an upper limit, reducing the inlet water flow of the first water inlet pump and the second water inlet pump; if the COD/nitrate nitrogen concentration ratio is less than a lower limit, increasing the inlet water flow of the first water inlet pump and the second water inlet pump.

* * * * *